(12) United States Patent
Hasegawa et al.

(10) Patent No.: US 8,885,771 B2
(45) Date of Patent: Nov. 11, 2014

(54) SIGNAL RECEIVING APPARATUS, SIGNAL RECEIVING METHOD AND SIGNAL RECEIVING PROGRAM

(75) Inventors: Ryo Hasegawa, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 13/370,837

(22) Filed: Feb. 10, 2012

(65) Prior Publication Data

US 2012/0250797 A1 Oct. 4, 2012

(30) Foreign Application Priority Data

Mar. 30, 2011 (JP) ................................. 2011-075957

(51) Int. Cl.
*H03K 9/00* (2006.01)
*H04L 7/08* (2006.01)
*H04L 25/03* (2006.01)
(52) U.S. Cl.
CPC . *H04L 7/08* (2013.01); *H04L 25/03* (2013.01); *H04L 25/03878* (2013.01)
USPC ........................................................ 375/316
(58) Field of Classification Search
USPC ........................................................ 375/316
See application file for complete search history.

(56) References Cited

U.S. PATENT DOCUMENTS

| 8,126,098 | B2* | 2/2012 | Yang et al. | 375/349 |
|---|---|---|---|---|
| 8,477,893 | B2* | 7/2013 | Yang et al. | 375/349 |
| 2002/0075857 | A1* | 6/2002 | LeBlanc | 370/352 |
| 2002/0097726 | A1* | 7/2002 | Garcia-Luna-Aceves et al. | 370/395.31 |
| 2008/0063034 | A1* | 3/2008 | Yang et al. | 375/148 |
| 2009/0310713 | A1* | 12/2009 | Hasegawa et al. | 375/316 |
| 2012/0099634 | A1 | 4/2012 | Maruyama et al. | |
| 2012/0099676 | A1* | 4/2012 | Hasegawa et al. | 375/340 |

FOREIGN PATENT DOCUMENTS

| JP | 62-217732 | 9/1987 |
|---|---|---|
| JP | 63-73744 | 4/1988 |
| JP | 3-62629 | 3/1991 |
| JP | 3-76434 | 4/1991 |
| JP | 2000-138874 | 5/2000 |
| JP | 2005-333301 | 12/2005 |
| JP | 2007-129757 | 5/2007 |
| JP | 2007-195075 | 8/2007 |
| JP | 2008-301369 | 12/2008 |
| WO | WO 2009/041046 A1 | 4/2009 |

OTHER PUBLICATIONS

U.S. Appl. No. 13/235,885, filed Sep. 19, 2011, Hasegawa, et al.
Office Action issued Sep. 16, 2014, in Japanese Patent Application No. 2011-075957 (with English-language Translation).

* cited by examiner

*Primary Examiner* — Santiago Garcia
(74) *Attorney, Agent, or Firm* — Oblon, Spivak, McClelland, Maier & Neustadt, L.L.P.

(57) ABSTRACT

Disclosed herein is a signal receiving apparatus including: a data-loss detection section configured to detect a data loss from a received signal; and a timing adjustment section configured to adjust a processing timing by the quantity of the data loss on the basis of the detection result of the data loss.

8 Claims, 9 Drawing Sheets

SIGNAL RECEIVING APPARATUS, SIGNAL RECEIVING METHOD AND SIGNAL RECEIVING PROGRAM

BACKGROUND

The present disclosure relates to a signal receiving apparatus, a signal receiving method adopted by the apparatus and a program implementing the method. More particularly, the present disclosure relates to a signal receiving apparatus capable of speedily keeping up with a timing change caused by a data loss, and relates to a signal receiving method adopted by the apparatus as well as a program for implementing the method.

In an ordinary digital demodulation apparatus, equalization processing is carried out after timing synchronization (refer to, for example, Japanese Patent Laid-open No. 2007-195075).

SUMMARY

Thus, if data is lost from a signal received by a digital demodulation apparatus for example, it takes certain time to synchronize with post-change timings after a timing change caused by the loss of the data before equalization processing can be carried out. As a result, when a signal receiving apparatus serving as a digital demodulation apparatus is receiving broadcasted waves of a television broadcast for example, it takes time to restore the displayed image to a normal state in the event of a data loss.

The present disclosure has been made in view of the above circumstance. It is desirable to provide a capability of speedily keeping up with a timing change caused by a data loss.

A signal receiving apparatus according to an embodiment of the present disclosure includes: a data-loss detection section configured to detect a data loss from a received signal; and a timing adjustment section configured to adjust a processing timing by the quantity of the data loss on the basis of the detection result of the data loss.

A signal receiving method according to another embodiment of the present disclosure is carried out by a signal receiving apparatus for receiving a signal, the method including: detecting a data loss from the received signal; and adjusting a processing timing by the quantity of the data loss on the basis of the detection result of the data loss.

A signal receiving program according to a further embodiment of the present disclosure causes a computer to carry out processing including: detecting a data loss from a received signal; and adjusting a processing timing by the quantity of the data loss on the basis of the detection result of the data loss.

In accordance with the aforementioned embodiments of the present disclosure, a data loss from a received signal is detected and a processing timing is adjusted by the quantity of the data loss on the basis of the result of detecting the data loss from the received signal.

It is to be noted that the signal receiving program can be provided to the user by transmitting the program through a transmission medium or by recording the program on a recording medium.

The signal receiving apparatus can be an independent apparatus or an internal block of an apparatus.

In accordance with the aforementioned embodiments of the present disclosure, it is possible to provide a capability of speedily keeping up with a timing change caused by a data loss.

DETAILED DESCRIPTION OF THE PREFERRED EMBODIMENTS

[Typical Configuration of Signal Receiving Apparatus]

Figure 1:
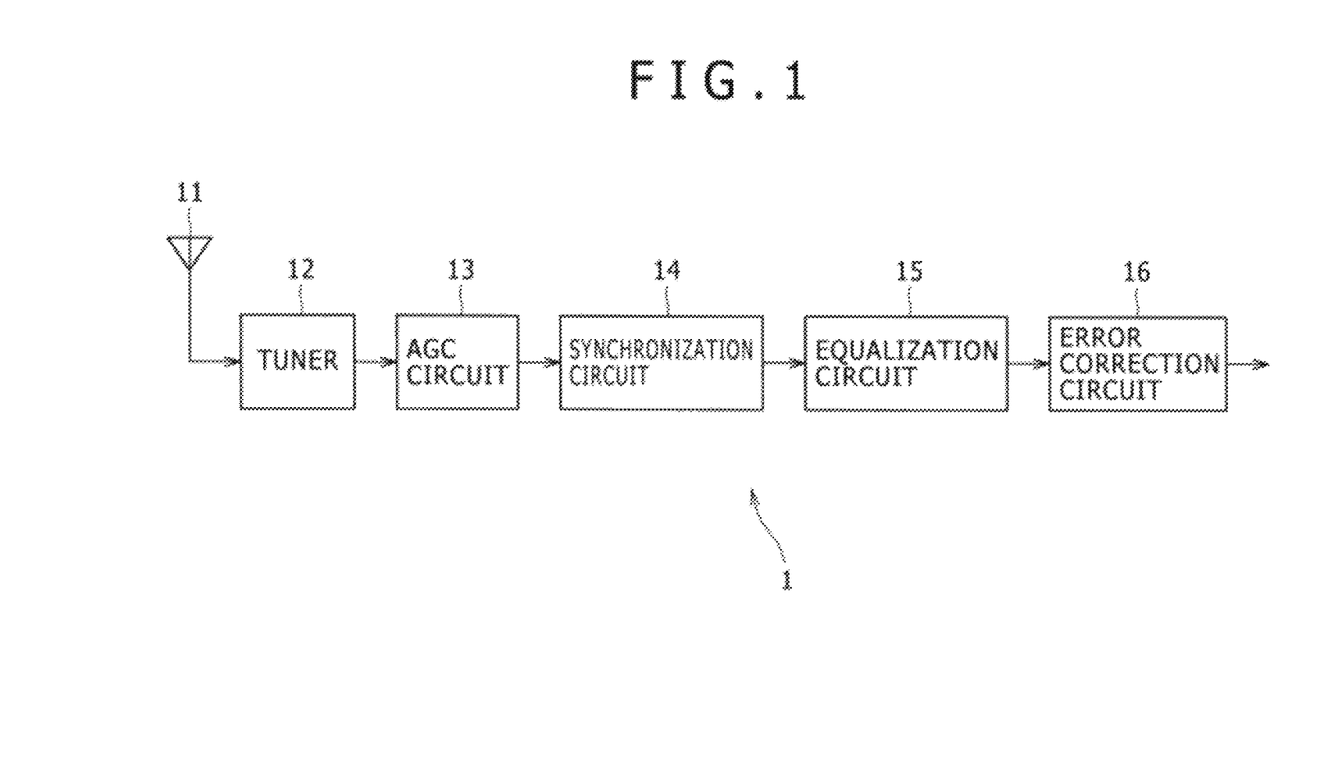
FIG. 1 is a block diagram showing a typical configuration of an embodiment implementing a signal receiving apparatus to which the present disclosure is applied.

FIG. 1 is a block diagram showing a typical configuration of an embodiment implementing a signal receiving apparatus 1 to which the present disclosure is applied.

The signal receiving apparatus 1 shown in FIG. 1 is an apparatus for receiving broadcasted waves transmitted by a signal transmitting apparatus of a broadcasting station not shown in the figure. In the following description, the broadcasted waves received by the signal receiving apparatus 1 are assumed to be a signal conforming to the VSB (Vestigial Sideband) system provided by the ATSC (Advanced Television Standard Committee) to serve as a terrestrial digital broadcasting system for the US. However, signals that can be received by the signal receiving apparatus 1 are not limited to the signal conforming to the VSB system.

As shown in the figure, the signal receiving apparatus 1 is configured to include an antenna 11, a tuner 12, an AGC (Automatic Gain Control) circuit 13, a synchronization circuit 14, an equalization circuit 15 and an error correction circuit 16.

The antenna 11 receives broadcasted waves transmitted as an RF (Radio Frequency) signal and supplies the signal to the tuner 12.

The tuner 12 multiplies the received RF signal by a signal with a frequency determined in advance to convert the RF signal into an IF (Intermediate Frequency) signal, and supplies the IF signal to the AGC circuit 13.

The AGC circuit 13 carries out AGC control on the IF signal received from the tuner 12. That is, the AGC circuit 13 controls the amplitude of the IF signal in accordance with a gain determined in advance. As is obvious from the above description, the IF signal is a signal obtained as a result of modulation according to the VSB system. A baseband signal obtained as a result of the AGC control is converted into a digital IF signal by an A/D (Analog-to-Digital) converter not shown in the figure. Then, the A/D converter supplies the digital IF signal to the synchronization circuit 14.

The synchronization circuit 14 carries out synchronization processing on the digital IF signal, which has been received from the AGC circuit 13, to establish synchronization of the IF signal, and supplies a signal obtained as a result of the synchronization processing to the equalization circuit 15.

The equalization circuit 15 carries out equalization processing on the signal, which has been received from the synchronization circuit 14, to make the phase of the signal same as the transmission-time phase and the amplitude of the signal equal to the transmission-time amplitude. Then, the equalization circuit 15 supplies an equalized signal obtained as a result of the equalization processing to the error correction circuit 16.

The error correction circuit 16 carries out deinterleave processing on the equalized signal. In addition, the error correction circuit 16 also carries out decode processing such as Viterbi decode processing and RS (Read Solomon) decode processing on the equalized signal. Finally, the error correction circuit 16 supplies decoded data obtained as a result of these various kinds of processing to an external output section or an output buffer, which are provided at the following stage, as a transport stream.

[Signal Conforming to VSB System of ATSC]

Figure 2:
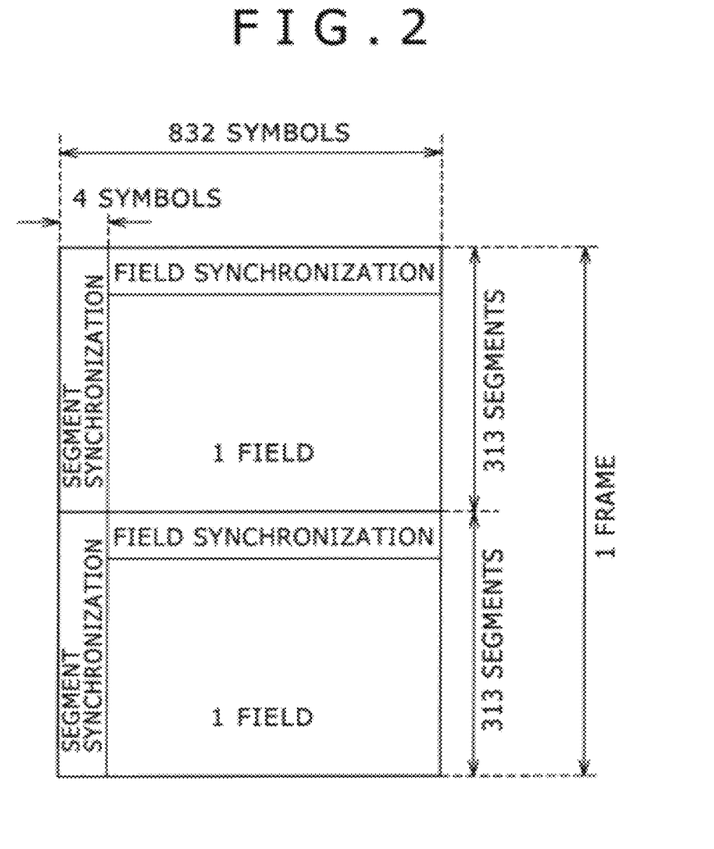
FIG. 2 is an explanatory diagram to be referred to in description of a signal conforming to the VSB (Vestigial Sideband) system provided by the ATSC (Advanced Television Standard Committee) to serve as a terrestrial digital broadcasting system for the US.

Next, by referring to FIG. 2, the following description briefly explains a signal conforming to the VSB system provided by the ATSC to serve as a terrestrial digital broadcasting system for the US.

As shown in FIG. 2, in the signal conforming to the VSB system provided by the ATSC, one frame includes two fields.

One field includes 313 segments. The first one of the 313 segments included in the field is a field synchronization signal. Every segment in the field has 832 data symbols. The first four symbols of the 832 data symbols are a segment synchronization signal. Each of the field synchronization signal and the segment synchronization signal is a signal known by the signal receiving apparatus 1. The signal receiving apparatus 1 is capable of improving the performance of the equalization processing by making use of the field synchronization signal and the segment synchronization signal which are known by the signal receiving apparatus 1.

[Details of Typical Configurations of Synchronization Circuit 14 and Equalization Circuit 15]

Figure 3:
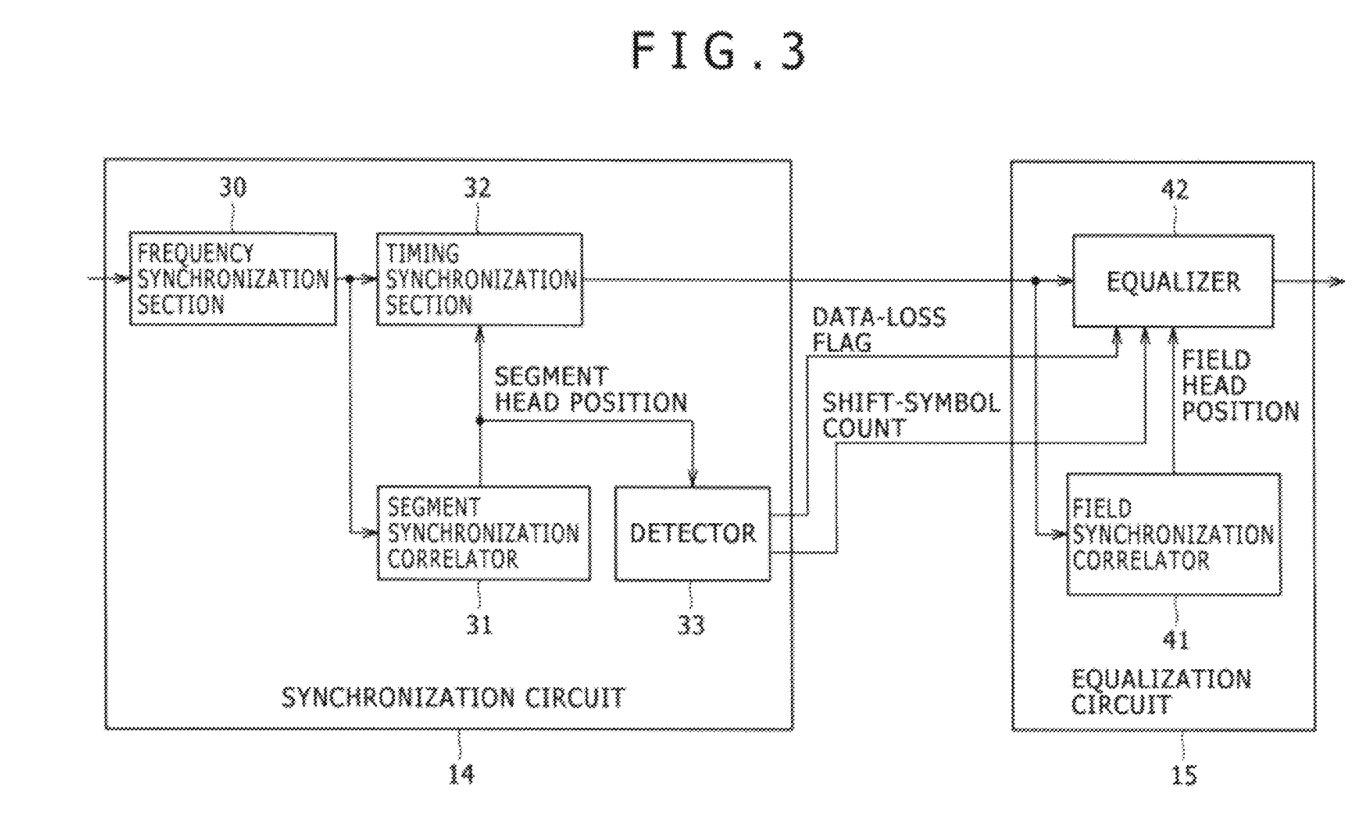
FIG. 3 is a block diagram showing details of typical configurations of a synchronization circuit and an equalization circuit which are shown in FIG. 1.

FIG. 3 is a block diagram showing details of typical configurations of the synchronization circuit 14 and the equalization circuit 15 which are shown in FIG. 1.

As shown in FIG. 3, the synchronization circuit 14 is configured to include a frequency synchronization section 30, a segment synchronization correlator 31, a timing synchronization section 32 and a detector 33 whereas the equalization circuit 15 is configured to include a field synchronization correlator 41 and an equalizer 42. It is to be noted that each of the synchronization circuit 14 and the equalization circuit 15 may be configured to include other sections for carrying out other processing in addition to those shown in the figure.

The frequency synchronization section 30 carries out frequency synchronization processing by reproducing carrier waves and establishing synchronization with the frequency of the carrier waves to convert the IF signal received from the AGC circuit 13 into a baseband signal, and supplies the baseband signal to the segment synchronization correlator 31 as well as the timing synchronization section 32.

The segment synchronization correlator 31 computes the values of correlations between the baseband signal received from the frequency synchronization section 30 and segment synchronization signals, detecting a symbol having a peak representing the maximum correlation value as the position of the head of a segment including the symbol. Then, the segment synchronization correlator 31 supplies the detected position of the head of the segment to the timing synchronization section 32 as well as the detector 33.

The timing synchronization section 32 establishes timing synchronization on the basis of a position received from the segment synchronization correlator 31 as the position of the head of the segment, and carries out a demodulation process corresponding to the VSB modulation process carried out on the signal received by the signal receiving apparatus 1. That is, the timing synchronization section 32 determines a demodulation interval for the baseband signal by taking the position of the head of the segment as a reference, and carries out the demodulation process on the baseband signal. Then, the timing synchronization section 32 supplies a signal obtained as a result of the demodulation process to the equalizer 42 employed in the equalization circuit 15.

The detector 33 detects the existence/nonexistence of a data loss on the basis of a position received from the segment synchronization correlator 31 as the position of the head of the segment. Then, if a data loss is detected, the detector 33 notifies the equalizer 42 employed in the equalization circuit 15 of the data loss by making use of a data-loss flag. In addition, the detector 33 also notifies the equalizer 42 of a data-loss quantity which is defined as the magnitude of a data (symbol) shift caused by the data loss.

The field synchronization correlator 41 employed in the equalization circuit 15 computes the values of correlations between the received signal and known field synchronization signals, detecting a symbol having the maximum correlation value as the position of the head of a field including the symbol. Then, the field synchronization correlator 41 supplies the position of the head of the field to the equalizer 42.

The equalizer 42 carries out an equalization process on the signal received from the timing synchronization section 32, and supplies an equalized signal obtained as a result of the equalization process to the error correction circuit 16 shown in FIG. 1. The equalizer 42 carries out control so as to converge each tap coefficient to an optimum value on the basis of typically the LMS (Least Mean Square) algorithm.

In addition, if data has been lost from the received signal, the equalizer 42 receives the data-loss flag indicating the data loss and the magnitude of a symbol shift caused by the data loss from the detector 33 employed in the synchronization circuit 14. If the equalizer 42 receives the data-loss flag and the magnitude of the symbol shift from the detector 33 employed in the synchronization circuit 14, the equalizer 42 adjusts (or shifts) the position of the head of the field by the magnitude of the symbol shift, and carries out an equalization process.

Next, processing carried out to detect a data loss is explained by referring to FIGS. 4A to 6.

[Processing Results of Segment Synchronization Correlator 31 for Normal Case]

Figure 4A:
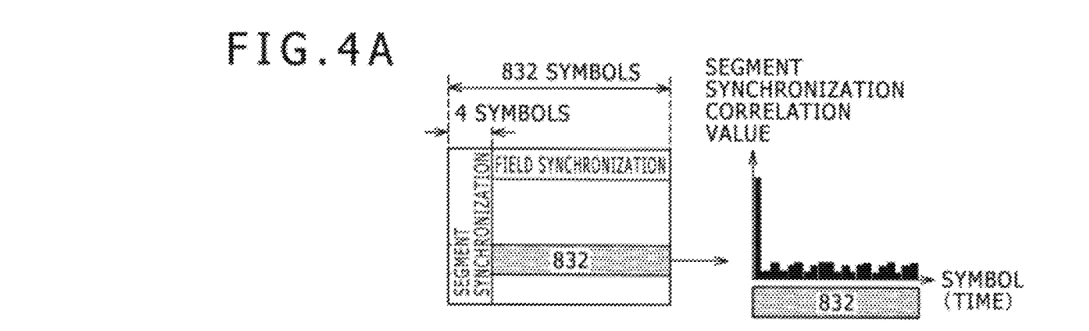
FIGS. 4A and 4B are diagrams showing processing results produced by a segment synchronization correlator for a normal case in which there is no data loss.
Figure 4B:
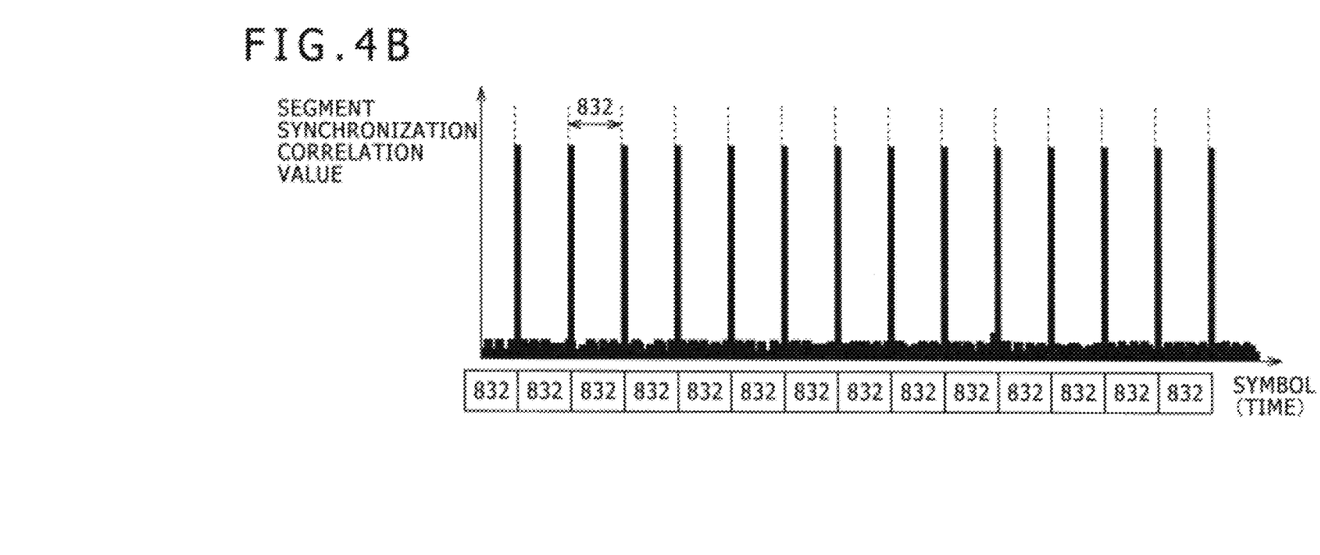

FIGS. 4A and 4B are diagrams showing processing results produced by the segment synchronization correlator 31 for a normal case in which there is no data loss.

To be more specific, FIG. 4A shows one field on the left side and a processing result produced by the segment synchronization correlator 31 for one segment on the right side whereas FIG. 4B shows a processing result produced by the segment synchronization correlator 31 for a plurality of consecutive segments.

The segment synchronization correlator 31 computes the value of a correlation between the received signal and a known segment synchronization signal occupying four consecutive symbols for every symbol. In the following description, the value of the correlation between the received signal and the segment synchronization signal occupying the four symbols is referred to as a segment synchronization correlation value. The segment synchronization correlation values computed for every symbol in 1 segment are shown on the right side of FIG. 4A by taking the horizontal axis as an axis for representing the symbols and the vertical axis as an axis representing the segment synchronization correlation values. If there is no data loss, the segment synchronization correlation value becomes a maximum referred to as a peak at the position of the head of the segment as shown on the right side of FIG. 4A. The computed segment synchronization correlation values of symbols in successive segments are shown in FIG. 4B in the same way as the right side of FIG. 4A. In this case, the peak of the computed segment synchronization correlation values is observed for every 832 symbols in each of the successive segments as shown in FIG. 4B. In this case, the peak of the computed segment synchronization correlation values is used to indicate that the segment synchronization correlation value of the peak is equal to or greater than a predetermined threshold value clearly identifiable from the computed value of a correlation with every signal other than the segment synchronization signal.

The segment synchronization correlator 31 detects the position of the head of a segment on the basis of the peak of the segment synchronization correlation values computed for symbols, and supplies the position of the head to the timing synchronization section 32 as well as the detector 33. It is to be noted that the segment synchronization signal occupies only four consecutive symbols. Thus, in order to improve the reliability, it is possible to provide a configuration in which processing such as leak integration and averaging in the time-axis direction is carried out on the segment synchronization correlation values computed for every symbol and, then, the position of the head of the segment is detected on the basis of the result of this processing.

[Signals Received in Event of Data Loss]

Figure 5:
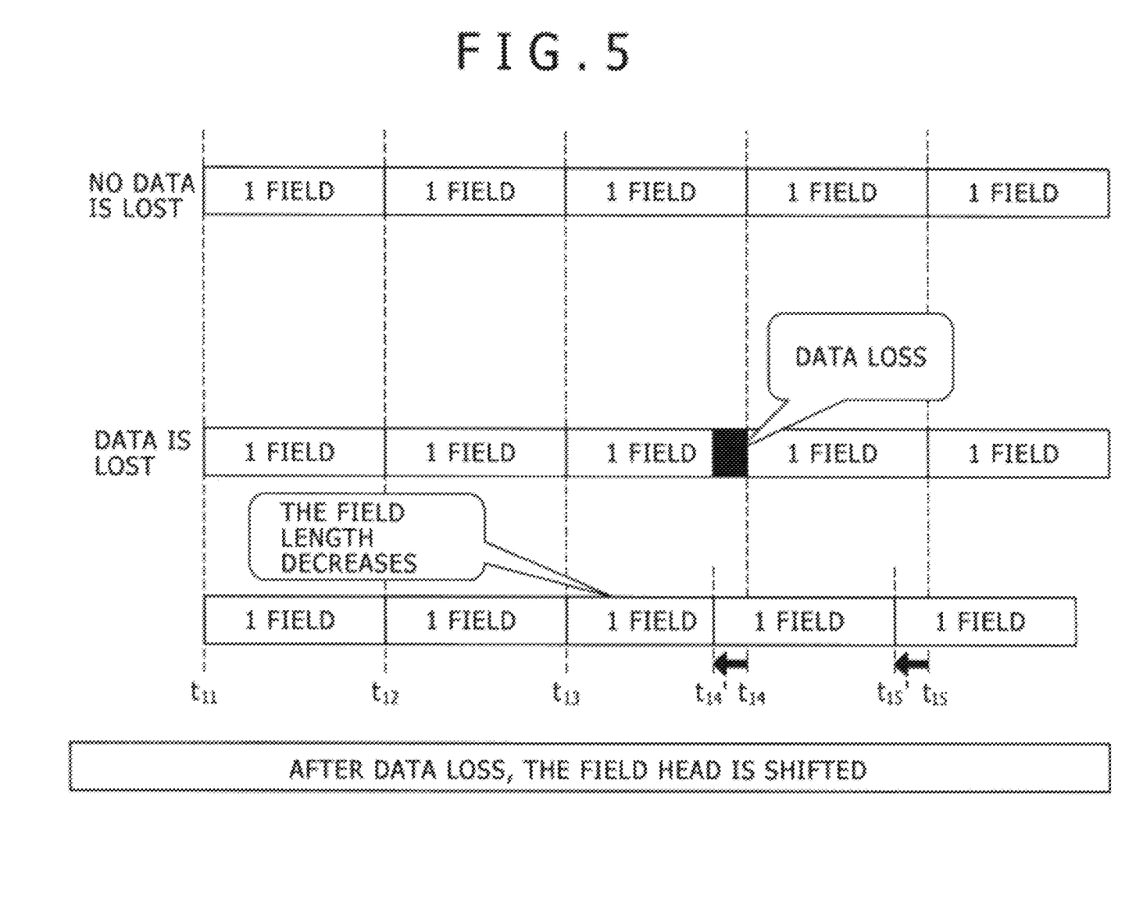
FIG. 5 is an explanatory diagram to be referred to in description of signals received in the event of a data loss.

Next, signals received in the event of a data loss are explained by referring to FIG. 5.

If there is no data loss, the signal receiving apparatus 1 receives field synchronization signals at the beginnings of fields with timings separated away from each other by equal intervals. That is, as shown on the top row of FIG. 5, a time period between times $t_{11}$ and $t_{12}$, a time period between times $t_{12}$ and $t_{13}$, a time period between times $t_{13}$ and $t_{14}$ and a time period between times $t_{14}$ and $t_{15}$ are each fixed. It is to be noted that the times $t_{11}$, $t_{12}$, $t_{13}$, $t_{14}$ and $t_{15}$ are each a time serving as a delimiter between pieces of data in successive fields for a normal case in which there is no data loss.

In the event of a data loss, on the other hand, the timing of data received after the occurrence time of the data loss is earlier than the timing of the same data received for a normal case in which there is no data loss by a time period corresponding to a data-loss quantity representing the amount of the lost data.

The middle row of FIG. 5 shows a case in which data is lost from a field received during the time period between the times $t_{13}$ and $t_{14}$. In this case, the amount of data received during the time period between the times $t_{13}$ and $t_{14}$ decreases by the quantity of the data loss. Thus, the data of a field which is received during the time period beginning at the time $t_{14}$ in a normal case starts to be received at a time $t_{14}'$ in the event of the data loss. By the same token, the data of a field which is received during the time period beginning at the time $t_{15}$ in a normal case starts to be received at a time $t_{15}'$ in the event of the data loss.

As described above, the timings at which field synchronization signals are received in the event of a data loss are undesirably different from the timings at which the same field synchronization signals are received in a normal case. It is to be noted that the shifts of such timings are observed not only in field synchronization signals, but also in segment synchronization signals as well.

[Processing Results Produced by Segment Synchronization Correlator 31 in Event of Data Loss]

Figure 6:
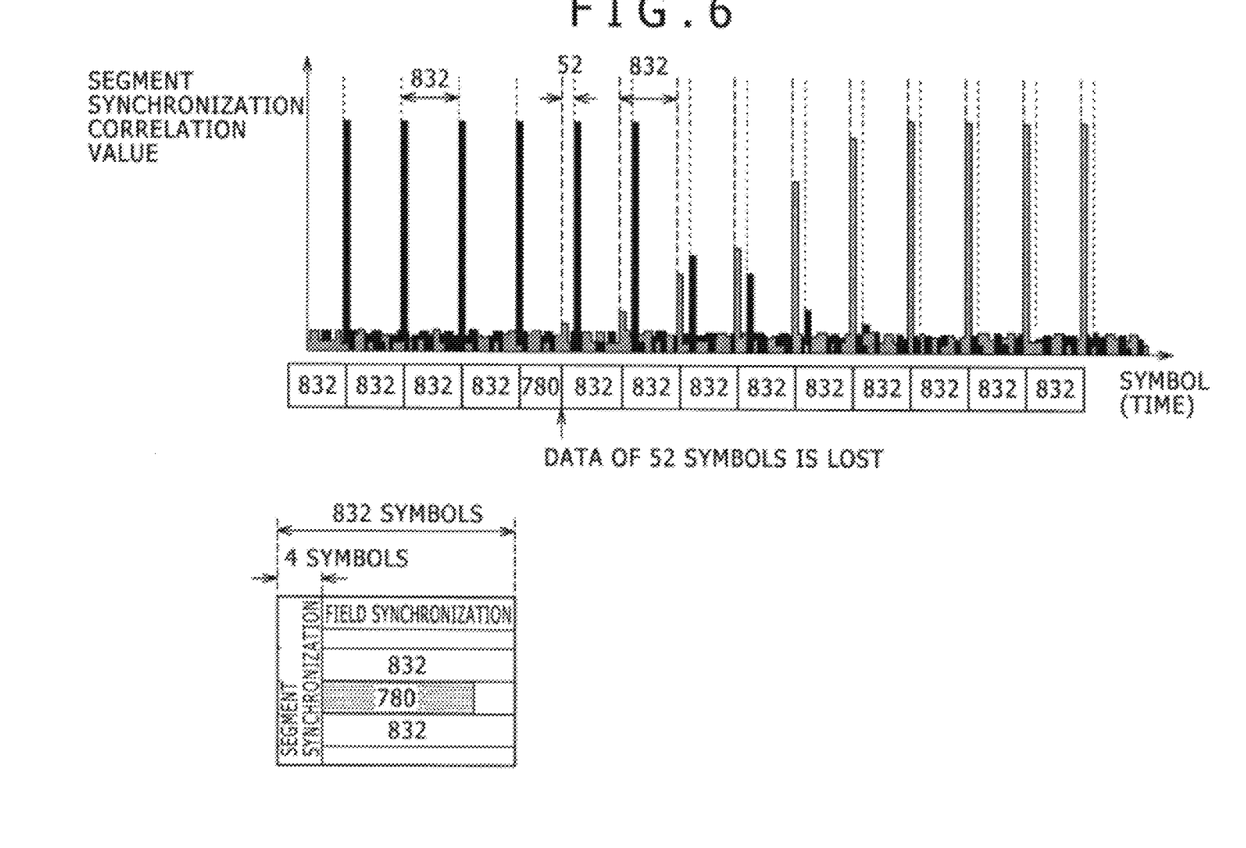
FIG. 6 is a diagram showing processing results produced by the segment synchronization correlator in the event of a data loss.

FIG. 6 is a diagram showing processing results produced by the segment synchronization correlator 31 in the event of a data loss. In FIG. 6, the quantity of the data loss is expressed by typically 52 symbols.

In FIG. 6, the segment synchronization correlation values computed for a normal case without the occurrence of the data loss are expressed by a histogram of the black color. Prior to the occurrence of the data loss, the peak of the segment synchronization correlation values appears at equal intervals which are each a time period occupied by 832 symbols. As described earlier, the integer 832 is the number of symbols included in each segment.

Then, the segment synchronization correlation values computed for a case with the occurrence of the data loss are expressed by a hatched histogram whose equal intervals following the occurrence of the data loss have positions different from those for the histogram of the black color. That is, after the data has been lost, the position of each peak in the hatched histogram for the case with the occurrence of the data loss appears earlier by 52 symbols than the position of each corresponding peak in the black-color histogram for the case without the occurrence of the data loss.

After the data has been lost, the values of peaks detected at positions (which are separated away from each other by equal intervals as the positions of the peaks of segment synchronization correlation values computed for a case without the occurrence of the data loss) as the peaks of segment synchronization correlation values decrease gradually. Conversely, after the occurrence of the data loss, the values of peaks each newly detected at a position (which precedes the corresponding position of the peak of segment synchronization correlation values computed for a case without the occurrence of the data loss by 52 symbols) as the peak of segment synchronization correlation values increase gradually. In addition, the peaks detected at positions (which are separated away from each other by equal intervals as the positions of the peaks of segment synchronization correlation values computed for a case without the occurrence of the data loss) as the peaks of segment synchronization correlation values eventually disappear and, thus, the peaks each newly detected at a position (which precedes the corresponding position of the peak of segment synchronization correlation values computed for a case without the occurrence of the data loss by 52 symbols) as the peak of segment synchronization correlation values remain as the only peaks.

It is to be noted that, in the typical example shown in FIG. 6, the positions of the peaks of the segment synchronization correlation values are replaced by the positions of the newly detected peaks not for all segments following the occurrence of the data loss, but only for several segments following the occurrence of the data loss because the aforementioned processing such as the averaging in the time-axis direction is being carried out in order to improve the reliability.

As described earlier by referring to FIG. 4, the segment synchronization correlator 31 detects the position of the head of a segment on the basis of the peak of the segment synchronization correlation values computed for symbols in the segment, and supplies the position of the head to the timing synchronization section 32 as well as the detector 33.

Thus, when the relation between the peak of the histogram of the black color and the peak of the hatched histogram is reversed in the typical example shown in FIG. 6, a head position supplied by the segment synchronization correlator 31 to the detector 33 as the position of the head of a segment is a position shifted from the position for the normal case without the occurrence of the data loss by a time period expressed in terms of a symbol count to represent the quantity of the data loss.

Every time the position of the head of a segment is supplied by the segment synchronization correlator 31 to the detector 33, the detector 33 computes the interval between the positions of the heads of two consecutive segments. To put it in detail, every time the position of the head of a specific segment is supplied by the segment synchronization correlator 31 to the detector 33, the detector 33 computes the number of symbols between the position of the head of the specific segment and the position of the head of a segment immediately preceding the specific segment. The computed number of symbols represents the time interval between the position of the head of the specific segment and the position of the head of a segment immediately preceding the specific segment.

If an interval computed for the specific segment as the interval between the position of the head of the specific segment and the position of the head of a segment immediately preceding the specific segment is equal to the interval computed for the immediately preceding segment, the detector 33 determines that there has not been a data loss. If an interval computed for the specific segment is different from the interval computed for the immediately preceding segment, on the other hand, the detector 33 determines that there has been a data loss. In this case, the detector 33 provides the equalizer 42 employed in the equalization circuit 15 with a data-loss flag and the number of symbols representing the magnitude of the shift of the segment position of the head or the quantity of the data loss.

Thus, the equalizer 42 becomes capable of knowing the correct timing of the field synchronization signal before acquiring the next incoming field synchronization signal. In other words, the equalizer 42 becomes capable of knowing the correct timing of the field synchronization signal following the occurrence of a timing change caused by the data loss before acquiring the field head position based on the correct field synchronization signal from the field synchronization correlator 41. The equalizer 42 carries out the equalization process by shifting the timing of the field synchronization by the magnitude of the shift of the position of the segment head. Thus, the equalizer 42 is capable of converging each tap coefficient to an optimum value without starting the equalization process all over again from the beginning.

It is also possible to provide a configuration in which the data-loss flag and the number of symbols representing the magnitude of the shift of the segment head position are supplied to the field synchronization correlator 41 whereas the field synchronization correlator 41 supplies a quantity used for correcting the position of the head of the field to the equalizer 42.

[Flow of Processing to Receive Signals]

Figure 7:
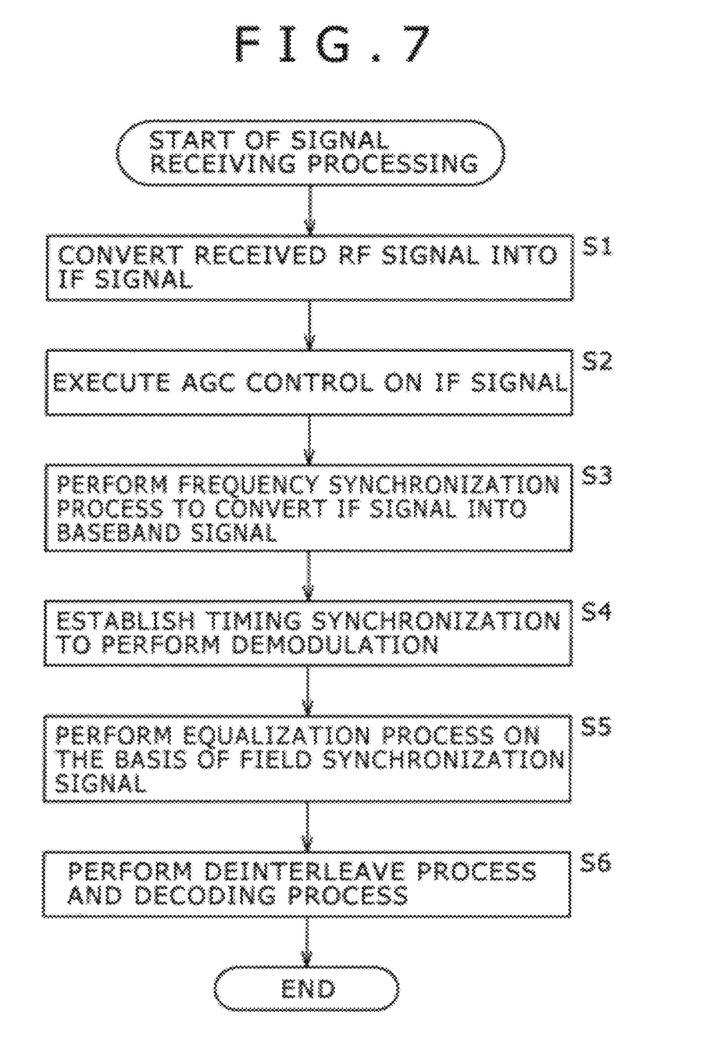
FIG. 7 shows a flowchart to be referred to in description of processing carried out to receive a signal.

FIG. 7 shows a flowchart referred to in the following description of processing carried out by the signal receiving apparatus 1 to receive a signal.

As shown in the figure, the flowchart begins with a step S1 at which the tuner 12 multiplies an RF signal received by the antenna 11 by a signal with a frequency determined in advance to convert the RF signal into an IF signal, and supplies the IF signal to the AGC circuit 13.

Then, at the next step S2, the AGC circuit 13 carries out AGC control on the IF signal received from the tuner 12. That is, the AGC circuit 13 controls the amplitude of the IF signal in accordance with a gain determined in advance. As is obvious from the description given earlier, the IF signal is a signal obtained as a result of modulation according to the VSB system. An IF signal obtained as a result of the AGC control is converted into a digital IF signal by an A/D converter. Then, the A/D converter supplies the digital IF signal to the synchronization circuit 14.

Subsequently, at the next step S3, the frequency synchronization section 30 employed in the synchronization circuit 14 carries out a frequency synchronization process by reproducing carrier waves and establishing synchronization with the frequency of the carrier waves to convert the IF signal received from the AGC circuit 13 into a baseband signal, and supplies the baseband signal to the segment synchronization correlator 31 as well as the timing synchronization section 32.

Then, at the next step S4, the timing synchronization section 32 establishes timing synchronization on the basis of the segment head position received from the segment synchronization correlator 31 and carries out a demodulation process corresponding to the VSB modulation process on the baseband signal. At the step S4, the segment synchronization correlator 31 computes a segment synchronization correlation value for every symbol and finds the maximum value of the computed segment synchronization correlation values. Then, the segment synchronization correlator 31 detects the position of the head of the segment on the basis of the maximum value and supplies the position of the head of the segment to the timing synchronization section 32.

Subsequently, at the next step S5, the equalizer 42 carries out an equalization process on the basis of a field synchronization signal and supplies an equalized signal obtained as a result of the equalization process to the error correction circuit 16.

Then, at the next step S6, the error correction circuit 16 carries out deinterleave processing on the equalized signal. In addition, the error correction circuit 16 also carries out decode processing such as Viterbi decode processing and RS decode processing on the equalized signal. Finally, the error correction circuit 16 supplies decoded data obtained as a result of these various kinds of processing to output buffer or the like, which is provided at the following stage, as a transport stream. Upon completion of this step, the processing carried out by the signal receiving apparatus 1 to receive a signal is ended.

[Processing to Detect Data Loss]

Figure 8:
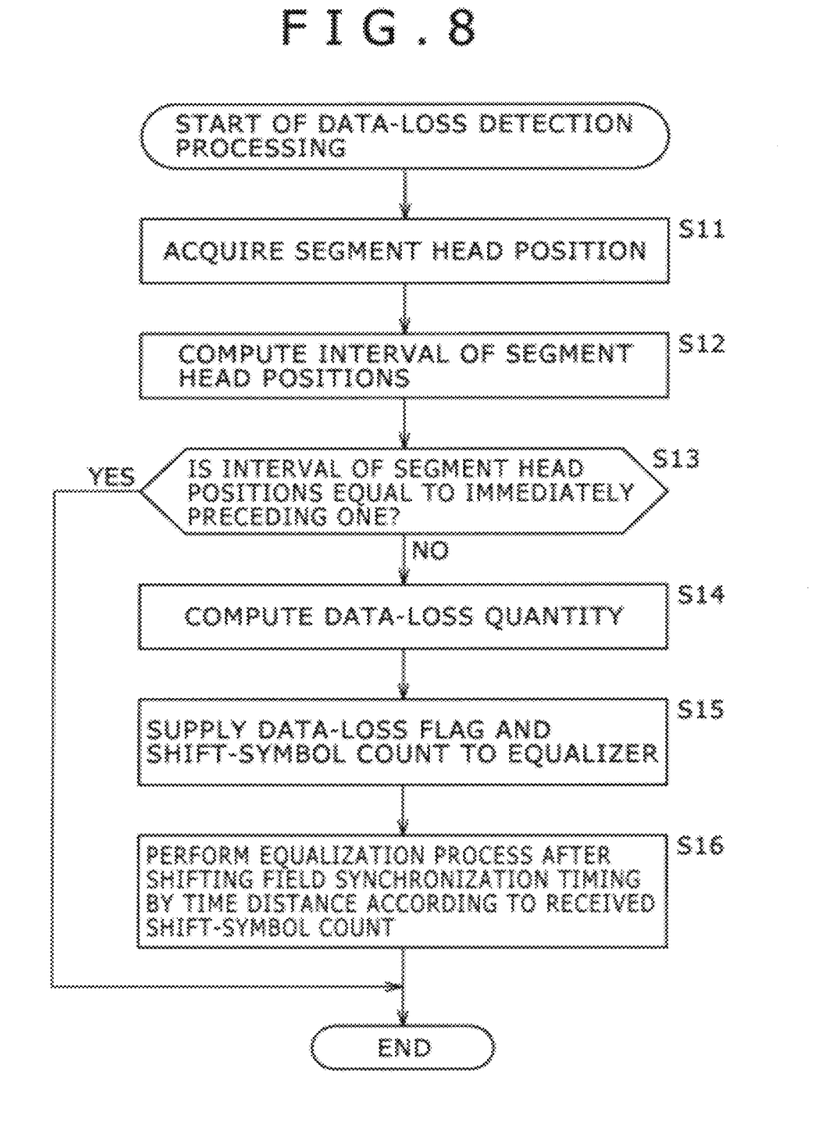
FIG. 8 shows a flowchart to be referred to in description of processing carried out to detect a data loss.

Next, by referring to a flowchart shown in FIG. 8, the following description explains processing carried out by the synchronization circuit 14 and the equalization circuit 15 to detect a data loss. This processing is carried out for example every time the position of the head of a segment is supplied by the segment synchronization correlator 31 to the detector 33.

As shown in the figure, the flowchart begins with a step S11 at which the detector 33 acquires the position of the head of a segment from the segment synchronization correlator 31.

Then, at the next step S12, the detector 33 computes an interval between the positions of the heads of two consecutive segments. To put it in detail, the detector 33 computes the number of symbols between the segment head position received at the step S11 as the position of the head of a specific segment and the position of the head of a segment immediately preceding the specific segment. The computed number of symbols represents the time interval between the position of the head of the specific segment and the position of the head of a segment immediately preceding the specific segment.

Subsequently, at the next step S13, the detector 33 determines whether or not the particular time interval computed at the step S12 as the interval between the positions of the heads of two consecutive segments is equal to a time interval immediately preceding the particular time interval.

If the detector 33 determines at the step S13 that the particular time interval between the positions of the heads of two consecutive segments is equal to the immediately preceding time interval between the positions of the heads of two consecutive segments, this processing to detect a data loss is ended. That is, in this case, segment synchronization signals are acquired at equal intervals, indicating that there has not been a data loss. Thus, this processing to detect a data loss is ended.

If the detector 33 determines at the step S13 that the particular time interval between the positions of the heads of two consecutive segments is not equal to the immediately preceding time interval between the positions of the heads of two consecutive segments to indicate that there has been a data loss, on the other hand, this processing to detect a data loss goes on to a step S14 at which the detector 33 computes a data-loss quantity expressed by a shift-symbol count representing the amount of lost data. The data-loss quantity is the difference between the particular time interval computed at the step S12 as the interval between the positions of the heads of two consecutive segments and the time interval immediately preceding the particular time interval.

Then, at the next step S15, the detector 33 supplies the data-loss flag and the shift-symbol count representing the data-loss quantity to the equalizer 42 employed in the equalization circuit 15.

Subsequently, at the next step S16, the equalizer 42 shifts the timing of the field synchronization by a time distance corresponding to the shift-symbol count received from the detector 33 and, then, carries out an equalization process. Upon completion of this step, this processing to detect a data loss is ended.

It is to be noted that the process carried out at the step S16 is described to explain the sequence of processes so as to make the sequence of processes easy to understand. The process carried out at the step S16 corresponds to the process carried out at the step S5 of the flowchart shown in FIG. 7. Thus, the description of the process carried out at the step S16 explains that the equalization process of the step S5 is carried out by shifting the timing of the field synchronization by a time distance corresponding to the shift-symbol count.

As described above, in accordance with the signal receiving apparatus 1 shown in FIG. 1, it is possible to immediately supply a shift detected in the data-loss detection processing as the shift of the timing of the field synchronization, to the equalizer 42 employed in the equalization circuit 15. As a result, the equalizer 42 is capable of knowing the correct timing of the field synchronization signal before acquiring a correct field head position obtained as a result of a timing change caused by a data loss from the field synchronization correlator 41.

As described above, the equalizer 42 shifts the timing of the field synchronization by a time distance corresponding to the shift-symbol count received from the detector 33 and, then, carries out an equalization process. Thus, the equalizer 42 is capable of converging each tap coefficient to an optimum value without starting the equalization process all over again from the beginning. That is, the equalizer 42 is capable of speedily keeping up with a timing change caused by a data loss. In other words, the equalizer 42 is capable of following such a timing change in a short period of time.

Thus even if the timing changes abruptly so that the timing synchronization is lost for example, in a display apparatus for displaying a signal of broadcasted waves received by the signal receiving apparatus 1, the displayed image can be restored fast to the normal state and the post-resynchronization image can be prevented from getting into a confusing state.

[Modified Version]

It is to be noted that, in addition to the embodiment described above, it is possible to adopt a modified version like one described as follows.

For example, in the embodiment described above, the detector 33 computes the data-loss quantity on the assumption that the data-loss quantity is not known. Then, the detector 33 supplies a shift-symbol count representing the data-loss quantity and a data-loss flag to the equalizer 42.

If the data-loss quantity is fixed (or constant) and known, however, the detector 33 merely determines whether or not the peak of the segment synchronization correlation values exists at a position determined in advance. That is, the detector 33 merely determines whether or not the peak of the segment synchronization correlation values exists at a location lagging behind the position of the head of the immediately preceding segment by one segment consisting of 832 symbols. Then, if the detector 33 determines that there is no peak of the segment synchronization correlation values at a position determined in advance, the detector 33 supplies only the data-loss flag to the equalizer 42. If the equalizer 42 recognizes the fact that data has been lost, the equalizer 42 carries out the equalization process after shifting the timing of the field synchronization by the fixed (or constant) data-loss quantity which is known.

In addition, it is possible to provide a configuration in which either a fixed data-loss quantity or a variable data-loss quantity can be selected manually. If a fixed data-loss quantity is selected, the shift-symbol count representing the fixed data-loss quantity can be set or entered.

As described above, the broadcasted waves received by the signal receiving apparatus 1 according to the embodiment of the present disclosure are signals conforming to the VSB system provided by the ATSC to serve as a terrestrial digital broadcasting system for the US. However, the present disclosure can also be applied to a case in which a signal other than the signal conforming to the VSB system is received. For example, the present disclosure can also be applied to another signal receiving apparatus for receiving a signal conforming to a QAM (Quadrature Amplitude Modulation) system in place of the VSB system.

Each series of processes described previously can be carried out by hardware and execution of software. If the series of processes described above is carried out by execution of software, programs composing the software can be installed into a computer from typically a network or a removable recording medium to be described later. The computer can be a computer embedded in dedicated hardware, a general-purpose personal computer or the like. The general-purpose personal computer is a personal computer, which is capable of carrying out a variety of functions by installing a variety of programs into the personal computer.

Figure 9:
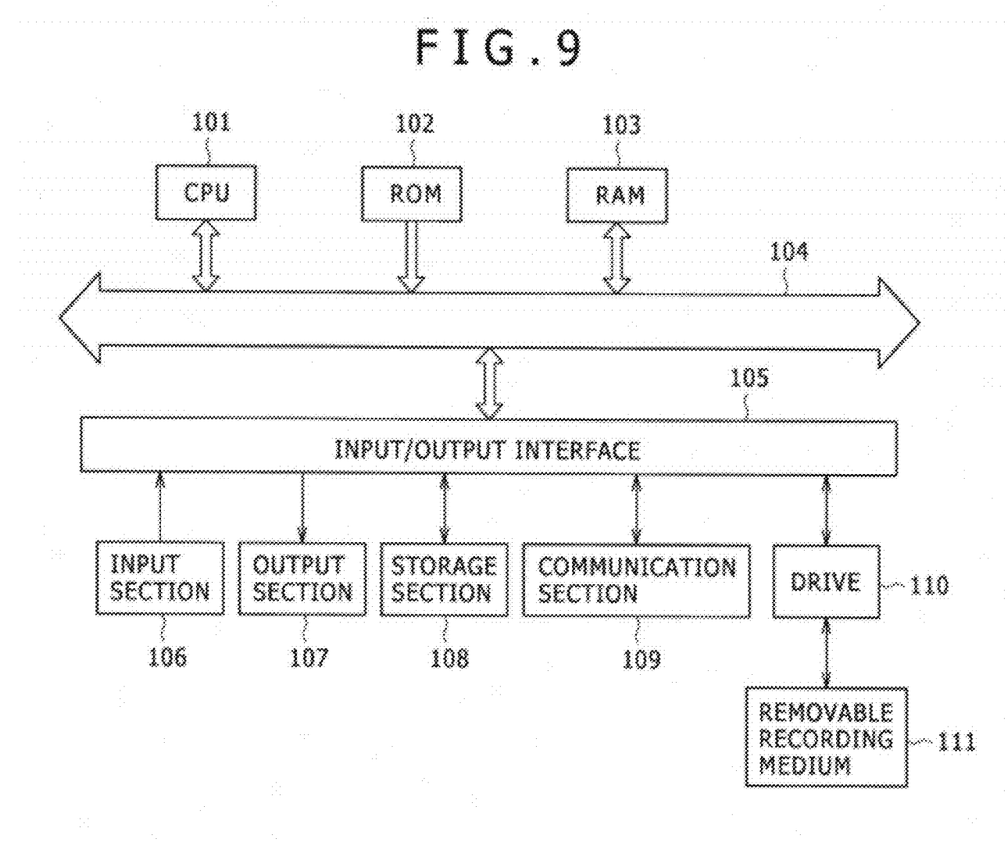
FIG. 9 is a block diagram showing a typical configuration of an embodiment implementing a computer to which the present disclosure is applied.

FIG. 9 is a block diagram showing a typical configuration of hardware of a computer for executing the programs to carry out the series of processes described earlier.

As shown in the figure, in the computer, a CPU (Central Processing Unit) 101, a ROM (Read Only Memory) 102 and a RAM (Random Access Memory) 103 are connected to each other by a bus 104.

The bus 104 is connected to an input/output interface 105 which is connected to an input section 106, an output section 107, a storage section 108, a communication section 109 and a drive 110.

The input section 106 includes a keyboard, a mouse and a microphone whereas the output section 107 includes a display unit and a speaker. The storage section 108 includes a hard disk and a nonvolatile memory whereas the communication section 109 has a network interface. The drive 110 drives a removable recording medium 111 such as a magnetic disk, an optical disk, a magneto-optical disk or a semiconductor memory.

In the computer having the configuration described above, the CPU 101 loads a program from typically the storage section 108 into the RAM 103 by way of the input/output interface 105 and the bus 104, executing the program to carry out a series of processes described above.

In the computer, when the removable recording medium 111 is mounted on the drive 110, a program can be installed from the removable recording medium 111 into the storage section 108 by way of the input/output interface 105. As an alternative, a program can also be downloaded from a program provider to the communication section 109 by way of a wire or wireless transmission medium to be installed into the storage section 108. Typical examples of the wire or wireless transmission medium include a local area network, the Internet and a digital satellite broadcasting system. As another alternative, a program can be stored in advance in the ROM 102 or the storage section 108.

Steps of each flowchart described above in this specification can be carried out not only in a prescribed order along the time axis, but also concurrently or individually instead of executing the steps in a prescribed order along the time axis. If the steps are carried out individually, the steps are invoked with necessary timings such as timings with which the steps are invoked.

It is to be understood that the present disclosure is not limited to the embodiments described above, and that various changes and modifications can be made without departing from the scope or spirit of the disclosure.

It is to be noted that typical implementations of the present disclosure include the following:

(1) There is provided a signal receiving apparatus including:
a data-loss detection section configured to detect a data loss from a received signal; and
a timing adjustment section configured to adjust a processing timing by the quantity of the data loss on the basis of the detection result of the data loss.

(2) In the signal receiving apparatus according to implementation (1),
the quantity of the data loss is fixed; and
when the data loss is detected, the timing adjustment section adjusts the processing timing by the fixed quantity of the data loss.

(3) In the signal receiving apparatus according to implementation (1) or (2),
the data-loss detection section also detects the quantity of the data loss; and
the timing adjustment section adjusts the processing timing by a quantity detected by the data-loss detection section as the quantity of the data loss.

(4) There is provided the signal receiving apparatus according to any one of implementations (1) to (3), further including
a signal processing section configured to process the received signal with a timing adjusted by the timing adjustment section.

(5) In the signal receiving apparatus according to implementation (4), the signal processing section carries out equalization processing on the received signal.

(6) There is provided a signal receiving method carried out by a signal receiving apparatus for receiving a signal, the method including:
detecting a data loss from the received signal; and
adjusting a processing timing by the quantity of the data loss on the basis of the detection result of the data loss.

(7) There is provided a signal receiving program for causing a computer to carry out processing including:
detecting a data loss from a received signal; and
adjusting a processing timing by the quantity of the data loss on the basis of the detection result of the data loss.

The present disclosure contains subject matter related to that disclosed in Japanese Priority Patent Application JP 2011-075957 filed in the Japan Patent Office on Mar. 30, 2011, the entire content of which is hereby incorporated by reference.

What is claimed is:

1. A signal receiving apparatus comprising:
circuitry configured to
compute a time interval between consecutive segment heads of segments included in a received signal,
determine whether the time interval is equal to an immediately preceding time interval previously computer by the circuitry,
detect a data loss from the received signal when the time interval is not equal to the immediately preceding time interval, and
adjust a processing timing by a quantity of said data loss on the basis of the detection result of said data loss.

2. The signal receiving apparatus according to claim 1, wherein the quantity of said data loss is fixed, and
when said data loss is detected, said circuitry adjusts said processing timing by said fixed quantity of said data loss.

3. The signal receiving apparatus according to claim 1, wherein said circuitry also detects the quantity of said data loss, and
said circuitry adjusts said processing timing by a quantity detected as said quantity of said data loss.

4. The signal receiving apparatus according to claim 1, wherein the circuitry is further configured to process said received signal with a timing adjusted by said circuitry.

5. The signal receiving apparatus according to claim 4, wherein said circuitry carries out equalization processing on said received signal.

6. A signal receiving method carried out by a signal receiving apparatus for receiving a signal, the method comprising:
computing, with circuitry, a time interval between consecutive segment heads of segments included in a received signal,
determining whether the time interval is equal to an immediately preceding time interval previously computed by the circuitry,
detecting a data loss from said received signal when the time interval is not equal to the immediately preceding time interval; and
adjusting a processing timing by a quantity of said data loss on the basis of the detection result of said data loss.

7. A non-transitory computer-readable medium encoded with computer-readable instructions thereon, the computer readable instructions when executed by a computer cause the computer to perform a method comprising:
  computing a time interval between consecutive segment heads of segments included in a received signal,
  determining whether the time interval is equal to an immediately preceding time interval previously computed,
  detecting a data loss from said received signal when the time interval is not equal to the immediately preceding time interval previously computed by the circuitry; and
  adjusting a processing timing by a quantity of said data loss on the basis of the detection result of said data loss.

8. The signal receiving apparatus according to claim 1, wherein each segment includes a plurality of data symbols, and the data loss is determined based on counting a number of received symbols between consecutive segment heads.

\* \* \* \* \*